(12) United States Patent
Bergevin et al.

(10) Patent No.: US 9,073,795 B2
(45) Date of Patent: Jul. 7, 2015

(54) METHOD FOR MITIGATING SOLID PRECIPITATION IN FERTILIZER DISPENSING SYSTEM

(71) Applicants: David W. Bergevin, Pasco, WA (US); Stephen D. Wolfe, Richland, WA (US); Alan S. Wicks, Kennewick, WA (US)

(72) Inventors: David W. Bergevin, Pasco, WA (US); Stephen D. Wolfe, Richland, WA (US); Alan S. Wicks, Kennewick, WA (US)

(73) Assignee: Verdesian Life Sciences, LLC, Cary, NC (US)

( * ) Notice: Subject to any disclaimer, the term of this patent is extended or adjusted under 35 U.S.C. 154(b) by 116 days.

(21) Appl. No.: 13/856,418

(22) Filed: Apr. 3, 2013

(65) Prior Publication Data

US 2014/0298721 A1 Oct. 9, 2014

(51) Int. Cl.
*A01B 79/00* (2006.01)
*C05B 7/00* (2006.01)

(52) U.S. Cl.
CPC .................................... *C05B 7/00* (2013.01)

(58) Field of Classification Search
USPC ........................................................ 47/58.1 R
See application file for complete search history.

(56) References Cited

U.S. PATENT DOCUMENTS

| | | | |
|---|---|---|---|
| 1,930,885 A * | 10/1933 | Rittler | 210/717 |
| 2,385,929 A | 10/1945 | Meites | |
| 3,592,386 A * | 7/1971 | Tschudy, Jr. | 239/10 |
| 3,649,175 A | 3/1972 | Legal, Jr. | |
| 3,798,020 A | 3/1974 | Parham, Jr. | |
| 3,909,228 A | 9/1975 | Nakashima | |
| 3,918,952 A | 11/1975 | Neumiller | |
| 4,336,052 A | 6/1982 | Chen | |
| 4,588,431 A | 5/1986 | Nakamura | |
| 5,372,626 A | 12/1994 | Zivion | |
| 5,514,200 A | 5/1996 | Lovatt | |
| 5,634,959 A | 6/1997 | Beaty | |
| 5,997,602 A | 12/1999 | Äijälä | |
| 6,346,131 B1 * | 2/2002 | Bergevin | 71/32 |
| 7,569,091 B1 | 8/2009 | Peters | |
| 8,419,820 B2 * | 4/2013 | Vriesema et al. | 71/33 |
| 2003/0164016 A1 * | 9/2003 | Bar-On et al. | 71/33 |
| 2006/0202057 A1 * | 9/2006 | Taggart et al. | 239/310 |
| 2008/0171379 A1 * | 7/2008 | Donndelinger | 435/264 |
| 2013/0079228 A1 * | 3/2013 | Freed | 504/206 |

* cited by examiner

*Primary Examiner* — Kristen C Hayes

(74) *Attorney, Agent, or Firm* — Christensen O'Connor Johnson Kindness PLLC

(57) ABSTRACT

A method for applying an agricultural fertilizer to a field through an irrigation system connected to a source of hard water, includes providing a fertilizer composition comprising a mixture of (i) a fertilizer component comprising an ammonium phosphate or an ammonium sulfate, and (ii) an acid comprising one or more of a phosphoric acid, a citric acid, a malic acid, a formic acid, and an oxalic acid; combining the fertilizer composition with hard water from the hard water source and providing the mixture to an irrigation system; and using the irrigation system to apply the mixture of fertilizer composition and hard water to the field.

11 Claims, No Drawings

METHOD FOR MITIGATING SOLID PRECIPITATION IN FERTILIZER DISPENSING SYSTEM

BACKGROUND

Polycation salts of the polyoxy anions are generally insoluble or poorly soluble. Polyoxy anions are anions that contain at least one non-oxygen atom and two or more oxygen atoms. Examples of polyoxy anions include phosphate, phosphite, sulfate, sulfite, nitrate, borate, arsenate, or selenate. Polyvalent cations are cations that have a charge of plus two (+2) or more in the ionic form. Examples of polyvalent cations include the ionic forms of calcium, magnesium, iron, zinc, manganese, copper, aluminum, and cadmium. Calcium, magnesium and other polyvalent cation phosphate salts are generally insoluble or very poorly soluble. According to the *Handbook of Chemistry and Physics*: calcium hypophosphate ($Ca_2P_2O_6.2H_2O$) is insoluble, calcium metaphosphate ($Ca(PO_3)_2$) is insoluble, calcium orthophosphate {di-sec.} ($CaHPO_4.2H_2O$), also known as natural brushite, is poorly soluble at 0.0316 grams per 100 grams of water at 38° C., calcium orthophosphate {mono-prim.} ($Ca(H_2PO_4)2.H_2O$) is soluble at 1.8 grams per 100 grams of water at 30° C., calcium orthophosphate {tri-tert.} ($Ca_3(PO_4)_2$), known as natural whitlockite, is soluble at 0.002 grams per 100 grams of water, calcium pyrophosphate ($CaP_2O_7$) is listed as insoluble, and calcium pyrophosphate pentahydrate ($CaP_2O_7.5H_2O$) is listed as slightly soluble. Other polyvalent cations, such as, but not limited to, calcium, magnesium, iron, zinc, manganese, copper, aluminum, and cadmium, form phosphate salts that follow a similar pattern of insolubility or very low solubility. The polyvalent cation salts of sulfate follow a similar pattern as do the polyvalent cation salts of other polyoxy anions.

The very limited solubility of calcium and magnesium phosphate salts is commonly recognized and has been used commercially in detergents wherein phosphate compounds were added as water softeners to remove the calcium and magnesium from the solution since calcium and magnesium interfered with the action of the active detergent agents. This use of phosphate is referenced in U.S. patents filed as early as 1942, for example, in U.S. Pat. No. 2,385,929, to Meltes, which is hereby incorporated by reference.

However, formation of poorly soluble polyvalent cation-polyoxy anion salts is a problem in agriculture. Irrigation of crops occurs in all parts of the world. It is common to apply fertilizers in the irrigation water or as a foliar application during the growing season. A problem arises when applying phosphorous containing fertilizers with "hard water." Hard water is water that contains polyvalent metal cations, calcium and magnesium being the most common. Adding phosphorous to water containing even a modest amount of calcium, magnesium, or other polyvalent ions can result in the formation of poorly soluble or insoluble phosphate salts. Calcium phosphate, in the form of brushite, is the most common. The creation of poorly soluble phosphates drastically reduces the fertilizer effectiveness of phosphorous additions. It can also result in these same phosphate salts precipitating and clogging the fertilizer application system components, such as nozzles, spray tank filters and screens, tubing, sprinklers, or drip irrigation emitters, thereby making it impossible to apply phosphate fertilizer using these methods. In these circumstances, the farmer has to find another way to apply the necessary phosphorous to his crops during the growing season or, as is more common, apply all of it into the soil before planting.

Many of the waters used for irrigation in the United States are considered "hard water," which refers to water having a high mineral content. The hardness of water is determined by the concentration of multivalent cations in the water. The U.S. Geological Survey (USGS) has created general guidelines for classification of the hardness of waters: 0 to 60 mg/L (milligrams per liter) of calcium carbonate equivalents is classified as "soft"; 61 to 120 mg/L is classified as 'moderately hard'; 121 to 180 mg/L is classified as "hard"; and 181 mg/L and higher is classified as "very hard." The molecular weight of calcium carbonate is 100.9 and the molecular weight of calcium is 40.08. Therefore, the hardness values convert as follows: 0 to 0.59 mM Ca (millimoles Ca/Liter) is "soft"; 0.60 to 1.19 mM calcium is "moderately hard"; 1.20 to 1.78 mM calcium is "hard"; and 1.79 mM calcium or more is "very hard."

Some irrigation waters are "very hard." For example, irrigation water from the Colorado River, a major source of irrigation water in the southwestern United States, is reported to be "very hard," with a calcium carbonate equivalent of 280 mg/L. The hardest waters (greater than 1,000 mg/L) have been measured in streams in Texas, New Mexico, Kansas, Arizona, and southern California.

Also, under similar conditions of hardness, poorly soluble calcium sulfate (gypsum) and other poorly soluble sulfate salts may form and reduce fertilizer efficiency and can even cause plugging of water applying devices of irrigation systems, such as spray nozzles, spray tank screens, sprinklers, microsprinklers, drip tape emitters, etc.

The problem of precipitate formation in irrigation systems when agricultural chemicals are mixed with hard water has been recognized for decades. For example, in U.S. Pat. No. 3,592,386, to Tschudy, Jr., which is hereby incorporated by reference, the inventor notes, "For example, an especially acute precipitate problem arises when pesticides or fertilizers containing phosphate compounds are admixed with hard irrigation water." The solution taught by Tschudy, Jr., comprises a method that includes forming separate but converging streams of irrigation water and phosphate solution, wherein the streams converge externally from the stream-forming means.

In U.S. Pat. No. 5,997,602, to Äijälä, which is hereby incorporated by reference, the inventor notes, "If such a concentrate solution/fertilizer solution contains calcium and/or magnesium salts and ordinary water-soluble phosphorus sources such as for instance monoammonium phosphate, diammonium phosphate or potassium phosphate, the pH of the solution will be so high that calcium forms insoluble phosphate salts. The insoluble component precipitates, thus clogging the irrigation system, and its nutrients are no longer in a form which the plants can utilize." Äijälä teaches "a stable, concentrated aqueous fertilizer suspension, which can be diluted with water to form a working solution, said suspension containing 10 to 60% by weight of water and 40 to 90% by weight of a plant nutrient composition."

In U.S. Pat. No. 7,569,091, to Peters, which is hereby incorporated by reference, the problem is again acknowledged; "Compounding this difficulty of determining the proper amounts or concentrations of multiple nutrients in compound fertilizers is the fact that nutrients when blended together can interact with each other, with counter ions, or with the solvent, normally water, in untoward ways." This is an even more significant problem in areas having 'hard' irrigation water; i.e., water with high ambient concentrations of Ca or Mg. The resulting precipitates can remove free nutrient from use by the plant and clog irrigation and spraying equipment."

Conventionally, fertilizers, for example, phosphates and sulfates, may be either pre-mixed with soft water prior to deliver to the user, or may be provided in concentrated form and mixed by the user with a deionized or soft water. In either case, the costs and inconvenience of shipping and handling large quantities of fluids is undesirable.

There remains a need to provide fertilizer compositions that can be used in conventional irrigation systems and that can be delivered with hard water without forming precipitates that can clog such irrigation systems.

SUMMARY

This summary is provided to introduce a selection of concepts in a simplified form that are further described below. This summary is not intended to identify key features of the claimed subject matter, nor is it intended to be used as an aid in determining the scope of the claimed subject matter.

A method for applying an agricultural fertilizer through an irrigation system is disclosed that inhibits the production of insoluble precipitates in the irrigation system, thereby protecting the system from clogging and related problems associated with such precipitates while also allowing the grower to use local hard water sources with the fertilizer composition. The method includes providing a concentrated fertilizer composition that includes an ammonium phosphate or ammonium sulfate fertilizer component and an acid component selected from one or more of citric acid, malic acid, formic acid, and oxalic acid; combining the fertilizer composition with hard water and providing the mixture to an irrigation system; and using the irrigation system to apply the fertilizer composition and hard water. The acid in the fertilizer composition inhibits the cations in the hard water from forming insoluble precipitates.

In an embodiment, the fertilizer component is ammonium phosphate, for example, a monoammonium phosphate.

In an embodiment, the acid is a citric acid.

In an embodiment, the molar ratio of the fertilizer component to the acid is not greater than 25:1. In an embodiment, this molar ratio is in the range of 5:1 to 25:1. In an embodiment this molar ratio is about 10:1.

In an embodiment, the acid is a binary mixture of any two of a phosphoric acid, the citric acid, the malic acid, and the oxalic acid.

In an embodiment, the acid comprises a dicaboxylic acid or a tricarboxylic acid.

In an embodiment, the acid is a combination of an organic acid and an inorganic acid.

DETAILED DESCRIPTION

The typical agricultural chemical applications of phosphate, sulfate, and other non-metal oxides applications are hindered or rendered ineffective by dissolved metals such as calcium, iron, and/or aluminum in the water used for creating aqueous solutions for application to the soil. Dissolved metals in water form insoluble compounds with these non-metals, which fall out of the aqueous solution and become useless and/or problematic. In particular, the insoluble solids can clog or otherwise interfere with agricultural irrigation systems.

Fertilizer products formulated according to U.S. Pat. No. 6,346,131, to Bergevin, which is hereby incorporated by reference, have been used in agriculture. Bergevin teaches, for example, a formulation comprising a monoammonium phosphate fertilizer and a citric acid. The acid was found to shield the fertilizer component in the soil, permitting more effective delivery of fertilizer to plant roots.

However, the present inventors have subsequently discovered that a similar formulation used in an irrigation system with a source of "hard water" will protect the fertilizer components from precipitating within the irrigation system. It has been found that the use of a product formulated with a fertilizer component, for example, a solution containing a phosphate or sulfate fertilizer and an acid such as a citric acid, in an irrigation system having a source of hard water, greatly reduced the precipitation of insoluble phosphate or sulfate salts, thereby protecting the irrigation system from clogging and the like. The dramatic reduction in precipitation was an unexpected result. Furthermore, upon further study it was found that the addition of conventional phosphate and sulfate containing fertilizers to waters that contained even low concentrations of polyvalent cations results in the formation of insoluble salts which can plug or clog irrigation equipment, and reduces the effective level of phosphate and sulfate fertilizers delivered by the irrigation system. The use of the current formulation substantially eliminated this precipitate formation both at high and low levels of polyvalent cations in the water. This result allowed growers to apply phosphate and sulfate fertilizers in conventional irrigation systems using local hard water sources. This allows lower-volume concentrated fertilizers to be shipped to the user, greatly reducing shipping costs, and avoids the need for the user to obtain soft/deionized water for mixing with the concentrated fertilizer.

The present invention discloses the use of polyoxy anion fertilizer products containing carboxylic acids at a sufficient level to allow mixing the fertilizer and acid combinations with waters containing sufficient polyvalent cations that would, with conventional polyoxy anion sources, normally result in the creation of poorly soluble or insoluble polyoxy anion salts. These poorly soluble or insoluble materials would, at low levels, reduce the effective application of the fertilizers, thereby potentially requiring more fertilizer or, at greater quantities, result in plugging irrigation and spray equipment.

Therefore, the present embodiment discloses the use of certain fertilizer product formulations, including polyoxy anionic fertilizer materials, as a means of applying said fertilizers to plants through the irrigation system using water that contains any concentration of polyvalent cations sufficient to reduce the amount of insoluble polyoxy anion salts in the water.

For example, tests were conducted to determine how much the use of citric acid inhibits the production of insoluble compounds during aqueous phosphate preparation, as compared to the typical agricultural chemical additive for phosphate 10-34-0 ammonium phosphate alone, when the water used for preparation is hard water containing calcium ions.

Distilled water was used to minimize outside contaminants; however, typical agricultural chemical additives are bulk unpurified materials that contain other non-metals. Typical agricultural chemical additives were used to provide realistic data.

In some tests, two solutions containing an equal amount of phosphate were prepared, one using 10-34-0 ammonium phosphate and one using 10-34-0 ammonium phosphate and citric acid with a molar ratio of 10:1 phosphate to citric acid. A hard-water simulant was prepared using reagent grade $CaCl_2$, and the phosphate solution and phosphate/citric acid solutions were combined with the hard-water simulant. The formation of solids in the solutions was estimated by filtration and dried filter weight measurement, and the results for the different solutions were compared.

The typical application strength of 10-34-0 ammonium phosphate and citric acid was diluted to make 100 mM phosphate solution. The standard commercial phosphate product, 10-34-0 (ammonium polyphosphate), was similarly diluted into a solution of 100 mM phosphate.

These solutions were mixed in different proportions to evaluate the effectiveness of the formulation in this embodiment as a protectant against precipitation of the fertilizer over a range of conditions hostile to aqueous phosphate application.

Example 1

This example compares solids production in hard-water (1.5 mM Ca) for a typical application of phosphate (using ammonium polyphosphate 10-34-0), compared to an equal amount of phosphate with the addition of a small amount of citric acid (a tricarboxylic acid).

(i) Hard water with ammonium phosphate addition:
955 mL distilled water
1.5 mmol Calcium (15 mL of 100 mM Ca solution)
3.0 mmol Phosphate (30 mL of 100 mM phosphate from 10-34-0)

(ii) Hard water with ammonium phosphate and citric acid addition:
952 mL distilled water
1.5 mmol Calcium (15 mL of 100 mM Ca solution)
3.0 mmol Phosphate (30 mL of 100 mM phosphate from 10-34-0)
0.3 mmol Citric Acid (3 mL of 100 mM citric acid)

In each case, the distilled water was put into a flask, and then the 15 mL of 100 mM Ca solution was added, giving a calcium concentration of about 1.5 mM. Two of these solutions were made and transferred to clean containers. The citric acid was then added to one of the two containers. The 30 mL of 100 mM phosphate was added to each of these containers simultaneously, and a timer started.

After 20 minutes of reaction time, the solutions were each poured through filters, dried for 24 hours, and weighed. The experiment was repeated eight times, and the eight runs were averaged and no outliers were excluded.

Results:

On average, the weight of the filter for the solution without the citric acid increased by 1173 mg. On average, the weight of the filter for the solution with the citric acid increased by only 25 mg. Therefore, the addition of the citric acid reduced filterable precipitate formation by 98%, greatly reducing the quantity of insoluble matter that would otherwise clog and/or interfere with the irrigation system. In addition, the phosphate that was prevented from precipitating remained soluble in the solution and therefore available for the plants.

Multiple species of calcium phosphate and other contaminant solids were formed. Co-precipitation, phosphate compound waters-of-hydration, preexisting solid contaminants, and un-desiccated moisture contributed to some weight increase.

Example 2

This example compares solids production in very hard-water (2.0 mM Ca) for a typical application of phosphate (using ammonium polyphosphate 10-34-0), compared to an equal amount of phosphate with the addition of a small amount of citric acid.

(i) Very hard water with ammonium polyphosphate addition:
960 mL distilled water
2.0 mmol Calcium (20 mL of 100 mM Ca solution)
2.0 mmol Phosphate (20 mL of 100 mM phosphate from 10-34-0)

(ii) Very hard water with ammonium phosphate and citric acid addition:
958 mL distilled water
2.0 mM Calcium (20 mL of 100 mM Ca solution)
2.0 mM Phosphate (20 mL of 100 mM phosphate from 10-34-0)
0.2 mM Citric Acid (2 mL of 100 mM Citric Acid)

In each case, distilled water was put into a flask, and then the 20 mL of 100 mM Ca solution was added giving a final calcium concentration of about 2.0 mM. Two of these solutions were made and transferred to clean containers. Then the citric acid was added to one of the two containers. The 20 mL of 100 mM phosphate was added to each of these containers simultaneously, and a timer started.

After 20 minutes of reaction time, the solutions were each poured through filters, dried for 24 hours, and weighed. The experiment was repeated eight times, and the eight runs were averaged and no outliers were excluded.

Results:

On average, the weight of the filter for the solution without the citric acid increased by 1397 mg. On average, the weight of the filter for the solution with the citric acid increased by only 26 mg. Therefore, the addition of the citric acid reduced the filterable precipitate formation by 98%, again greatly reducing the quantity of insoluble matter that would otherwise clog and/or interfere with the irrigation system.

Example 3

This example compares solids production in extremely hard-water (50 mM Ca) for an extreme application of phosphate (using 10-34-0 ammonium phosphate), compared to an equal amount of phosphate with citric acid, in the same conditions. In this example, no filtered water is added to the aqueous calcium and phosphate solutions.

(i) Extremely hard water with ammonium phosphate addition:
2.0 mmol Calcium (20 mL of 100 mM Ca)
2.0 mmol Phosphate (20 mL of 100 mM phosphate from 10-34-0)

(ii) Extremely hard water with ammonium phosphate and citric acid addition:
2.0 mmol Calcium (20 mL of 100 mM Ca)
2.0 mmol Phosphate (20 mL of 100 mM phosphate from 10-34-0)
0.2 mmol Citric Acid (2 mL of 100 mM Citric Acid)

In each case, the 20 mL of 100 mM Ca was put into a separate container and the citric acid was added to one of the two containers. Then the 20 mL solution of 100 mM phosphate was added to each of these containers simultaneously, giving a final calcium concentration of 50 mM, and a timer started.

After 10 minutes of reaction time, the solutions were each poured through filters, dried for 24 hours, and weighed. The experiment was repeated eight times, and the eight runs conducted were averaged and no outliers were excluded.

Results:

On average, the weight of the filter for the solution without the citric acid increased by 1440 mg. On average, the weight of the filter for the solution with the citric acid increased by only 46 mg. Therefore, the addition of the citric acid to the solution reduced the filterable precipitate formation by 97%, again greatly reducing the quantity of insoluble matter that would otherwise clog and/or interfere with the irrigation system.

Example 4

Example 4 is similar to Example 3, except using different acids. In one test citric acid and phosphoric acid were added, and in another test a malic acid was added (an organic dicarboxylic acid), rather than citric acid. These tests were conducted to determine how much the use of these different acids inhibit the production of insoluble compounds during aqueous phosphate preparation alone, as compared to the typical agricultural chemical additive for phosphate 10-34-0 ammonium phosphate, when the water used for preparation is extremely hard water containing calcium ions.

This example compares solids production in extremely hard-water (50 mM Ca) for an extreme application of phosphate (using 10-34-0 ammonium phosphate), compared to an equal amount of phosphate with a combination of citric and phosphoric acid (an inorganic acid), and compared to a malic acid, in the same conditions.

(i) Extremely hard-water with ammonium phosphate addition:
  2.0 mmol Calcium (20 mL of 100 mM Ca)
  2.0 mmol Phosphate (20 mL of 100 mM phosphate from 10-34-0)

(ii) Extremely hard water with ammonium phosphate and a combination of citric and phosphoric acid addition:
  2.0 mmol Calcium (20 mL of 100 mM Ca)
  2.0 mmol Phosphate (20 mL of 100 mM phosphate from 10-34-0)
  0.2 mmol Citric Acid (2 mL of 100 mM Citric Acid)
  0.2 mmol Phosphoric Acid (2 mL of 100 mM phosphoric acid)

(iii) Extremely hard water with ammonium phosphate with malic acid addition:
  2.0 mmol Calcium (20 mL of 100 mM Ca)
  2.0 mmol Phosphate (20 mL of 100 mM phosphate from 10-34-0)
  0.2 mmol Malic Acid (2 mL of 100 mM Malic Acid)

In each case, the 20 mL of 100 mM calcium was put into a separate container. In one set of tests, the citric and phosphoric acid were added to one of the containers. In a second set of tests, the malic acid was added to one of the containers. Then the 20 mL of 100 mM phosphate was added to each of these containers, giving a final calcium concentration of 50 mM, and a timer started.

After 10 minutes of reaction time the solutions were each poured through filters, dried for 24 hours and weighed. The experiment was repeated eight times, and the eight runs conducted were averaged and no outliers were excluded.

Results:

On average, the weight of the filter for the solution without the citric and phosphoric acid and without the malic acid increased by 1450 mg. On average, the weight of the filter for the solution with the citric and phosphoric acid increased by only 46 mg. On average, the weight of the filter for the solution with the malic acid increased by only 35 mg. Therefore, the addition of the citric and phosphoric acids to the solution reduced the filterable precipitate formation by 97%, and the addition of the malic acid reduced filterable precipitate formation by 98%. Again, the acid addition greatly reduced the quantity of insoluble matter that would otherwise clog and/or interfere with the irrigation system.

Example 5

Example 5 illustrates the use of acids to inhibit the production of insoluble compounds during aqueous phosphate preparation, as compared to the typical agricultural chemical additive for phosphate 10-34-0 ammonium phosphate alone, when the water used for preparation is hard water containing calcium, iron and aluminum ions.

This example compares solids production in extremely hard-water for an extreme application of phosphate using 10-34-0 ammonium phosphate, compared to an equal amount of phosphate in 10-34-0 ammonium phosphate with a combination of citric and malic acid, and separately with addition of oxalic acid (an organic, dicarboxylic acid), in the same conditions).

(i) Extremely hard-water with ammonium phosphate addition:
  2.0 mmol Calcium (20 mL of 100 mM Ca)
  2.0 mmol Iron (20 mL of 100 mM Fe)
  2.0 mmol Aluminum (20 mL of 100 mM Al)
  2.0 mmol Phosphate (20 mL of 100 mM phosphate from 10-34-0)

(ii) Extremely hard-water with ammonium phosphate with a combination of citric and malic acid addition:
  2.0 mmol Calcium (20 mL of 100 mM Ca)
  2.0 mmol Iron (20 mL of 100 mM Fe)
  2.0 mmol Aluminum (20 mL of 100 mM Al)
  2.0 mmol Phosphate (20 mL of 100 mM phosphate from 10-34-0)
  0.2 mmol Citric Acid (2 mL of 100 mM citric acid)
  0.2 mmol Malic Acid (2 mL of 100 mM malic acid)

(iii) Extremely hard-water with ammonium phosphate with oxalic acid addition:
  2.0 mmol Calcium (20 mL of 100 mM Ca+)
  2.0 mmol Iron (20 mL of 100 mM Fe+3)
  2.0 mmol Aluminum (20 mL of 100 mM Al+3)
  2.0 mmol Phosphate (20 mL of 100 mM phosphate from 10-34-0)
  0.2 mmol Oxalic Acid (2 mL of 100 mM oxalic acid)

In each case, the 20 mL of 100 mM calcium, 20 mL of 100 mM Fe (as FeCl3), and 20 mL of 100 mM Al (as $AlCl_3$) was added to a one-liter flask. Two of these solutions were made and transferred to clean containers. Then the 2 mL of 100 mM citric acid and the 2 mL malic acid were added to one of the containers, and the 2 mL of 100 mM oxalic acid was added to another of the containers. Then the 20 mL of 100 mM phosphate was added to each of these containers simultaneously, giving a final cation (Ca+2, Fe+3, and Al+3) concentration of 70 mM, and a timer started.

After 10 minutes of reaction time, the solutions were each poured through filters, dried for 24 hours, and weighed. The eight runs conducted were averaged and no outliers were excluded.

Results:

On average, the weight of the filter for the solution without any acid addition increased by 2020 mg. On average, the weight of the filter for the solution with a combination of citric and malic acid filter increased by only 34 mg. On average, the weight of the filter for the solution with oxalic acid increased by only 8 mg. Therefore, the addition of the citric and phosphoric acids to the solution reduced the filterable precipitate formation by 98%, and the addition of the oxalic acid reduced filterable precipitate formation by 99%.

Example 6

Example 6 illustrates how much the use of citric acid and how much the use of malic acid inhibits the production of insoluble compounds during aqueous sulfate preparation. The molar ratio of 9-0-0-10 ammonium sulfate to acid remained the same, at 10:1 sulfate to citric acid.

This example compares solids production in extremely hard-water for an extreme application of sulfate using ammonium sulfate, compared to an equal amount of sulfate in 9-0-0-10 ammonium sulfate with the addition of citric acid, and separately with the addition of malic acid, in the same conditions.

(i) Extremely hard-water with ammonium sulfate addition:
  2.0 mmol Calcium (20 mL of 100 mM Ca)
  2.0 mmol Sulfate (20 mL of 100 mM sulfate from 9-0-0-10)

(ii) Extremely hard-water with ammonium sulfate with a citric acid addition:
  2.0 mmol Calcium (20 mL of 100 mM Ca)
  2.0 mmol Sulfate (20 mL of 100 mM sulfate from 9-0-0-10)
  0.2 mmol Citric acid (20 mL of 100 mM citric acid)

(iii) Extremely hard-water with ammonium sulfate with malic acid addition:
  2.0 mmol Calcium (20 mL of 100 mM Ca)
  2.0 mmol Sulfate (20 mL of 100 mM sulfate from 9-0-0-10)
  0.2 mmol Malic Acid (2 mL of 100 mM malic acid)

In each case, the 20 mL of 100 mM Ca was added to separate one-liter containers. Then the 20 mL of 100 mM citric acid was added to one of the containers, and the 20 mL of 100 mM malic acid was added to another of the containers. Then the 20 mL of 100 mM sulfate solution was simultaneously added to each of these containers, giving a final calcium concentration of about 50 mM, and a timer started.

After 10 minutes of reaction time, the solutions were each poured through filters, dried for 24 hours, and weighed. The eight runs conducted were averaged and no outliers were excluded.

Results:

On average, the weight of the filter for the solution without any acid addition increased by 92 mg. On average, the weight of the filter for the solution having citric acid addition increased by 14 mg. On average, the weight of the filter for the solution having malic acid addition increased by 10 mg. Therefore, the addition of the citric acid to the solution reduced the filterable precipitate formation by 85%, and the addition of the malic acid to the solution reduced the filterable precipitate formation by 89%.

As illustrated in the above examples, the use of a relatively small amount of an acid, for example, a citric acid, a malic acid, an oxalic acid, a phosphoric acid, formic acid (a simple carboxylic acid), or a combination of more than one of these acids, when mixing a fertilizer component containing non-metal anions, for example, an ammonium phosphate, such as a monoammonium phosphate, or an ammonium sulfate, can very significantly reduce the formation of precipitates within an irrigation system, providing significant protection against clogging of the irrigation system. A molar concentration of fertilizer component to acid of about 10:1 phosphate or sulfate to any of the disclosed acids substantially eliminates the formation of insoluble precipitates. Other molar concentrations have been tested and have been found effective. For example, a molar concentration of fertilizer component to acid component as low as 5:1 is effective, but does not improve the inhibitory functionality substantially over a ratio of 10:1. A molar concentration of fertilizer component to acid component to acid component as high as 25:1 is effective at reducing insoluble precipitate formation, but is less effective, resulting in insoluble precipitate formation approximately three times greater than the amount of precipitates formed using a molar ratio of 10:1.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for applying an agricultural fertilizer to a field through an irrigation system using hard water from a source of hard water, the method comprising:
    (a) providing a fertilizer composition comprising a mixture of (i) a fertilizer component comprising an ammonium phosphate or an ammonium sulfate, and (ii) an acid comprising one or more of a citric acid, a malic acid, a formic acid, and an oxalic acid;
    (b) combining the fertilizer composition with hard water from the source of hard water and providing the mixture to an irrigation system; and
    (c) using the irrigation system to apply the mixture of fertilizer composition and hard water to the field;
    wherein the acid in the fertilizer composition inhibits the cations in the hard water from forming insoluble precipitates in the irrigation system and further wherein the acid comprises a combination of an organic acid and an inorganic acid.

2. The method of claim 1, wherein the fertilizer component is ammonium phosphate and comprises a monoammonium phosphate.

3. The method of claim 1, wherein the fertilizer component is ammonium sulfate.

4. The method of claim 1, wherein the acid comprises a citric acid.

5. The method of claim 1, wherein the molar ratio of the fertilizer component to the acid in the fertilizer composition is not greater than 25:1.

6. The method of claim 1, wherein the molar ratio of the fertilizer component to the acid in the fertilizer composition is about 10:1.

7. The method of claim 1, wherein the molar ratio of the fertilizer component to the acid in the fertilizer composition is in the range of 5:1 and 25:1.

8. The method of claim 1, wherein the acid comprises a binary mixture of any two of the formic acid, the citric acid, the malic acid, and the oxalic acid.

9. The method of claim 1, wherein the acid comprises a dicarboxylic acid or a tricarboxylic acid.

10. The method of claim 1, wherein the acid comprises an inorganic acid.

11. The method of claim 1 wherein the fertilizer composition further comprises a phosphoric acid.

* * * * *